C. C. PITTMAN AND G. MIDBOE.
CONNECTING ROD.
APPLICATION FILED DEC. 21, 1916.

1,307,454.

Patented June 24, 1919.

Inventors
Clovis C. Pittman,
Gabriel Midboe
By their Attorneys
Kenyon & Kenyon

UNITED STATES PATENT OFFICE.

CLOVIS C. PITTMAN, OF NEW YORK, AND GABRIEL MIDBOE, OF BROOKLYN, NEW YORK, ASSIGNORS TO RICHARD P. LYDON, OF NEW YORK, N. Y.

CONNECTING-ROD.

1,307,454.      Specification of Letters Patent.     Patented June 24, 1919.

Application filed December 21, 1916. Serial No. 138,189.

*To all whom it may concern:*

Be it known that we, CLOVIS C. PITTMAN and GABRIEL MIDBOE, citizens of the United States, and residents of the borough of Bronx, county of Bronx, State of New York, and borough of Brooklyn, county of Kings, State of New York, respectively, have invented certain new and useful Improvements in Connecting-Rods, of which the following is a specification.

Our invention relates to connecting rods, and is particularly adapted for connecting rods to be used in internal combustion engines and similar places. We have found that by making a connecting rod having a longitudinal passage through it and passages through each of the ends for the wrist-pin and the crank-shaft, and having the surfaces of the passages hardened to a depth of about one-thirty-secondth of an inch, or a little more, and having this surrounded by an integral wall of unhardened metal, that we have a connecting rod having hardened wearing surfaces combined with strength due to the toughness of the unhardened metal, and a connecting rod in which the bearings are integral, thus dispensing with separate bushings or bearings.

Figure 1:
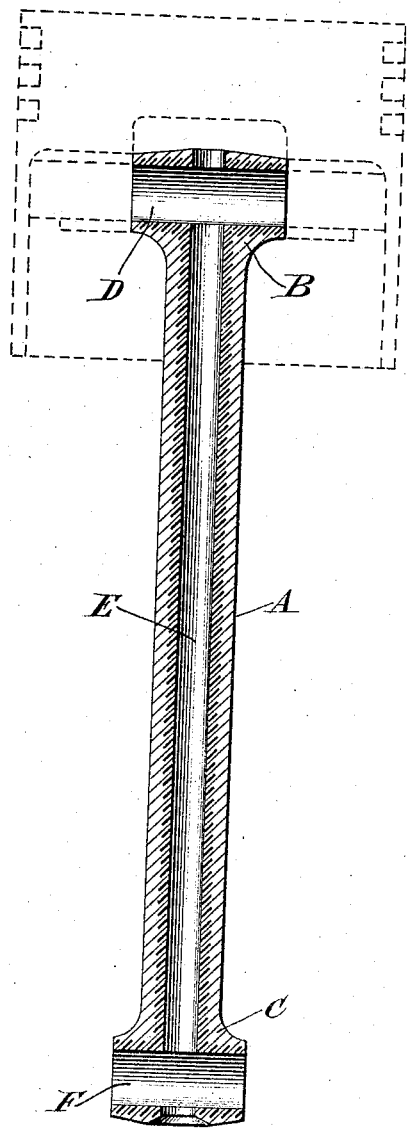
Figure 1 is a sectional view of a connecting rod.
Figure 2:
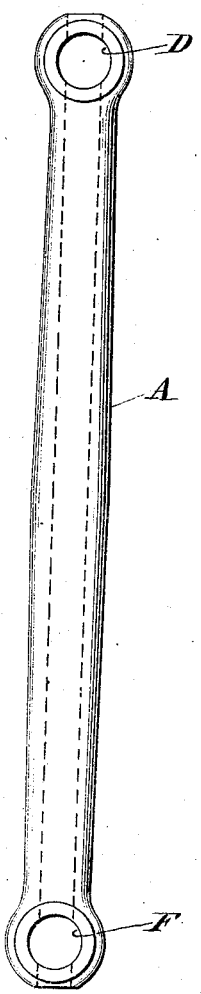
Fig. 2 is a side view.

In the drawings, A represents the connecting rod having at each end enlarged portions B and C. The enlarged portion B is provided with a passage D through which the wrist-pin to connect it with the piston passes. The opposite end is provided with an enlarged portion C through which is formed the passage F to connect with the crank shaft. E is a passage through the center of the connecting rod, which may be utilized for lubricant to pass through, and for that purpose, the opening, as it enters the lower end of the connecting rod, is gradually enlarged or countersunk so as to readily permit the oil to enter as it comes in contact with that portion of the connecting rod. A portion of the oil which enters the lower end of the connecting rod will pass around the pin passing through the opening F, lubricate that bearing, pass up through the central channel E around the wrist pin D, lubricate that bearing and out to the underside of the piston head.

The piston is shown as particularly adapted for use in rotary internal combustion engines, such as is shown in our application, Serial No. 120,422.

The method of manufacture of our connecting rod is made the subject-matter of our copending application, Serial No. 138,188, and is briefly as follows:

The connecting rod is formed in the rough by forging, after which the hole E is bored through the entire length of the rod and the hole for the wrist-pin D through the end B, and the hole F through the end C. The holes or passages through the connecting rod are then packed with bone carbon or other carbonizing material and then the rod is packed in a receptacle containing carbonizing material and placed in a furnace where it is baked at a sufficiently high temperature and for a sufficient length of time to permit the surface or walls of the passages and the outer surface of the rod to become impregnated with carbon so as to form a shell of carbon-impregnated metal. The length of time the rod is so baked and the temperature depend upon the metal used and the thickness of the carbon-impregnated shell desired. After a rod has been thus baked for a sufficient length of time and at a sufficiently high temperature, preferably above red heat, it is removed and allowed to slowly cool. This produces a rough forging with an external and internal surfaces or shells of material impregnated with carbon, capable of being hardened, leaving the material between the shells tough. The outer shell is then removed in any suitable way so that we now have a connecting rod, the outer material of which is tough and not capable of being hardened to any appreciable degree by tempering, and having the walls of the passages or the holes formed of a carbon-impregnated material, capable of being hardened by tempering. The rod is then heated to a suitable temperature, preferably above red heat, and suddenly cooled. The sudden chilling hardens the carbon-impregnated shell, while the outer surface of the rod is not hardened to any appreciable extent. The holes or passages D and F of the connecting rod are then ground and polished so as to afford bearing surfaces for the wrist-pin.

This process results in a connecting rod having integral bearing surfaces, thereby dispensing with the usual separate bushings or bearings.

While we have described one method of preparing the walls of the passages or holes for hardening by carbonizing, any suitable method of preparing the walls of the passages for hardening may be utilized.

Having described our invention, what we claim as new and desire to secure by Letters Patent is:

1. A connecting rod provided with enlarged ends having a passage extending longitudinally through the connecting rod and passages through the enlarged ends at an angle thereto, the metal surrounding said passages being harder than the metal forming the exterior of the connecting rod.

2. A connecting rod having a bearing therein, integral therewith, provided with a relatively hard, ground and polished surface.

3. A connecting rod having a passage extending longitudinally through the connecting rod, the metal surrounding said passage being harder than the metal forming the exterior of the connecting rod.

4. In a one-piece connecting rod provided with enlarged ends, a passage extending longitudinally through the connecting rod and passages through the enlarged ends at an angle thereto, the metal surrounding said passages being harder than the metal forming the exterior of the connecting rod.

In testimony whereof, we have signed our names to this specification.

CLOVIS C. PITTMAN.
GABRIEL MIDBOE.

Copies of this patent may be obtained for five cents each, by addressing the "Commissioner of Patents, Washington, D. C."